(12) United States Patent
Hong

(10) Patent No.: US 8,547,418 B2
(45) Date of Patent: Oct. 1, 2013

(54) METHOD AND SYSTEM FOR PROCESSING AND DISPLAYING VIDEO IN THREE DIMENSIONS USING A LIQUID CRYSTAL DISPLAY

(75) Inventor: Sunkwang Hong, Doylestown, PA (US)

(73) Assignee: Broadcom Corporation, Irvine, CA (US)

( * ) Notice: Subject to any disclaimer, the term of this patent is extended or adjusted under 35 U.S.C. 154(b) by 655 days.

(21) Appl. No.: 12/838,697

(22) Filed: Jul. 19, 2010

(65) Prior Publication Data

US 2012/0013707 A1    Jan. 19, 2012

(51) Int. Cl.
*H04N 13/00*    (2006.01)
*G09G 3/36*    (2006.01)

(52) U.S. Cl.
USPC ............................................. 348/43; 345/100

(58) Field of Classification Search
USPC ........................................... 348/43; 345/100
See application file for complete search history.

(56) References Cited

U.S. PATENT DOCUMENTS

| 2007/0013643 A1* | 1/2007 | Hong et al. ............... 345/100 |
| 2009/0079680 A1* | 3/2009 | Yagiura ..................... 345/87 |
| 2010/0225570 A1* | 9/2010 | Liu et al. .................. 345/92 |
| 2010/0289884 A1* | 11/2010 | Kang ........................ 348/58 |

* cited by examiner

*Primary Examiner* — Sath V Perungavoor
*Assistant Examiner* — Xiaolan Xu
(74) *Attorney, Agent, or Firm* — Thomas | Horstemeyer, LLP.

(57) ABSTRACT

Herein described are at least a method and a system for generating three dimensional stereoscopic video. The system and method may be used to drive pixels in a liquid crystal display (LCD) to generate such 3-D video. The method comprises processing received video by way of inserting black data into the video wherein the black data is displayed by main pixels and/or sub-pixels of a liquid crystal display (LCD). The method further comprises sequentially transmitting the processed frames to a display for viewing the video in three dimensions. An exemplary system comprises one or more circuits for performing the aforementioned method.

24 Claims, 3 Drawing Sheets

METHOD AND SYSTEM FOR PROCESSING AND DISPLAYING VIDEO IN THREE DIMENSIONS USING A LIQUID CRYSTAL DISPLAY

CROSS-REFERENCE TO RELATED APPLICATIONS/INCORPORATION BY REFERENCE

Not Applicable

FEDERALLY SPONSORED RESEARCH OR DEVELOPMENT

Not Applicable

MICROFICHE/COPYRIGHT REFERENCE

Not Applicable

BACKGROUND OF THE INVENTION

Traditional methods of displaying 3 dimensional images on a television may result in crosstalk occurring between the left and right channels. Crosstalk may occur because of inadequate response times associated with pixels of a liquid crystal display (LCD) when images are displayed over shorter frame refresh periods. As a consequence, the picture quality provided by the LCD may suffer as frame rates increase.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention provide a method and a system of processing video for providing three dimensional images to a liquid crystal display. The various aspects and representative embodiments of the method and system are substantially shown in and/or described in connection with at least one of the following figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Various aspects of the invention can be found in a method and a system of driving pixels in a liquid crystal display (LCD) such that video may be displayed and viewed in three dimensions with minimal crosstalk. In three dimensional or stereoscopic viewing, video frames are transmitted to either the right eye or the left eye. The various aspects of the invention facilitate generation of frames for the left eye (i.e., left frames) and of frames for the right eye (i.e., right frames). The left frames are used for viewing by a viewer's left eye while the right frames are used for viewing by a viewer's right eye. When a person watches a program in three dimensions, a pair of shutter glasses may be worn to allow the appropriate frames to be viewed by the left eye or the right eye. Thus, the glasses may be used to temporally direct left frames to the left eye and right frames to the right eye. For example, the glasses may alternately block the transmission of video to one of the other eye. Therefore, for a particular frame period, only one eye is able to visualize the image displayed on the LCD. The various aspects of the invention provide for a reduction of crosstalk between images produced by the left and right frames. To achieve a reduction in crosstalk, the various aspects of the invention may process received video such that a black pixel or black sub-pixel is displayed for a pixel of a first frame while video associated with the video program is displayed for a corresponding pixel of the next (or second) frame. The first frame is displayed to the left (or right) eye while the second frame is displayed to the right (or left) eye. Thus, by way of processing the video to take advantage of the spatial and temporal differences between two corresponding pixels (i.e., their main pixels and sub-pixels) between two successive frames, crosstalk or overlap between images of sequential frames can be reduced. The techniques employed in the invention may be adapted for use in liquid crystal displays (LCDs) providing a resolution of 1920×1080 pixels, for example. The various aspects of the invention may be employed in LCDs that provide a frame rate or refresh rate of 240 Hz, for example. When the desired frame rate is 240 Hz, the liquid crystal display needs to have a response time of approximately 4 milliseconds.

Figure 1:
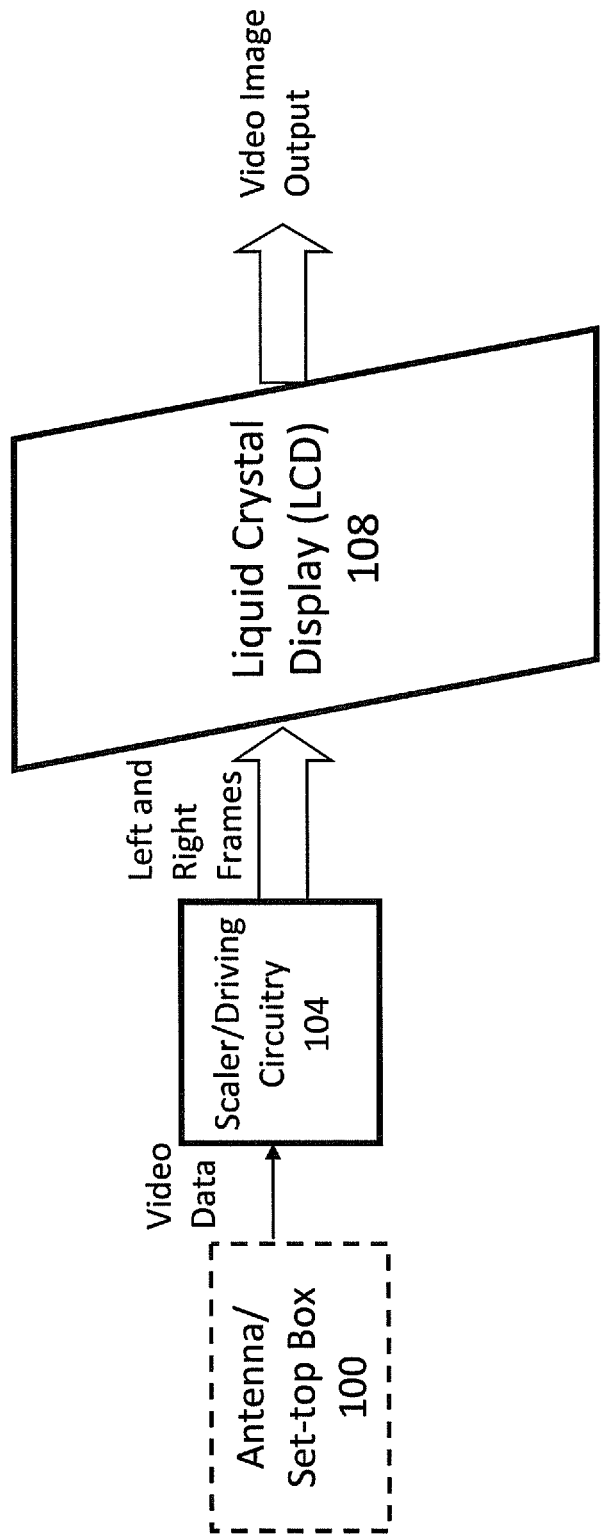
FIG. 1 is a system block diagram for processing video and generating three dimensional images in accordance with an embodiment of the invention.

FIG. 1 is a system block diagram for processing video and generating three dimensional images in accordance with an embodiment of the invention. An antenna/set-top box 100 may be used to receive video data or video programming provided by a carrier such as a cable operator. The scaler/driving circuitry 104 receives the video data transmitted by the carrier. The scaler/driving circuitry 104 processes the video data for three dimensional or stereoscopic viewing. The scaler/driving circuitry 104 comprises one or more circuits used to process received video data and to drive pixels for displaying three dimensional images to a viewer. The scaler/driving circuitry 104 may process the received video data such that displayed image may be converted from one size or resolution to another. The conversion may allow the video to be displayed to a display or television having a certain pixel resolution. The scaler/driving circuitry 104 may sequentially output a left frame followed by a right frame recursively to the liquid crystal display (LCD) 108. The scaler/driving circuitry 104 may be used to insert black data (or data corresponding to black color or low level luma) into the received video of a frame such that the black data is displayed by a main pixel or sub-pixel of a liquid crystal display (LCD). For example, the scaler/driving circuitry 104 may be used to insert black data into the received video such that one or more main pixels of a frame display the black data to a viewer. Likewise, for example, the scaler/driving circuitry 104 may be used to insert black data into the received video such that one or more sub-pixels of a frame display the black data to a viewer. In a representative embodiment, black data is inserted into the received video data such that main pixels for even numbered pixels of an even numbered frame display the black data. In a representative embodiment, black data is inserted into the received video data such that sub-pixels for odd numbered pixels of an even numbered frame display the black data. In a representative embodiment, black data is inserted into the received video data such that main pixels for odd numbered pixels of an odd numbered frame display the black data. In a representative embodiment, black data is inserted into the received video data such that sub-pixels for even numbered pixels of an odd numbered frame display the black data.

Figure 2:
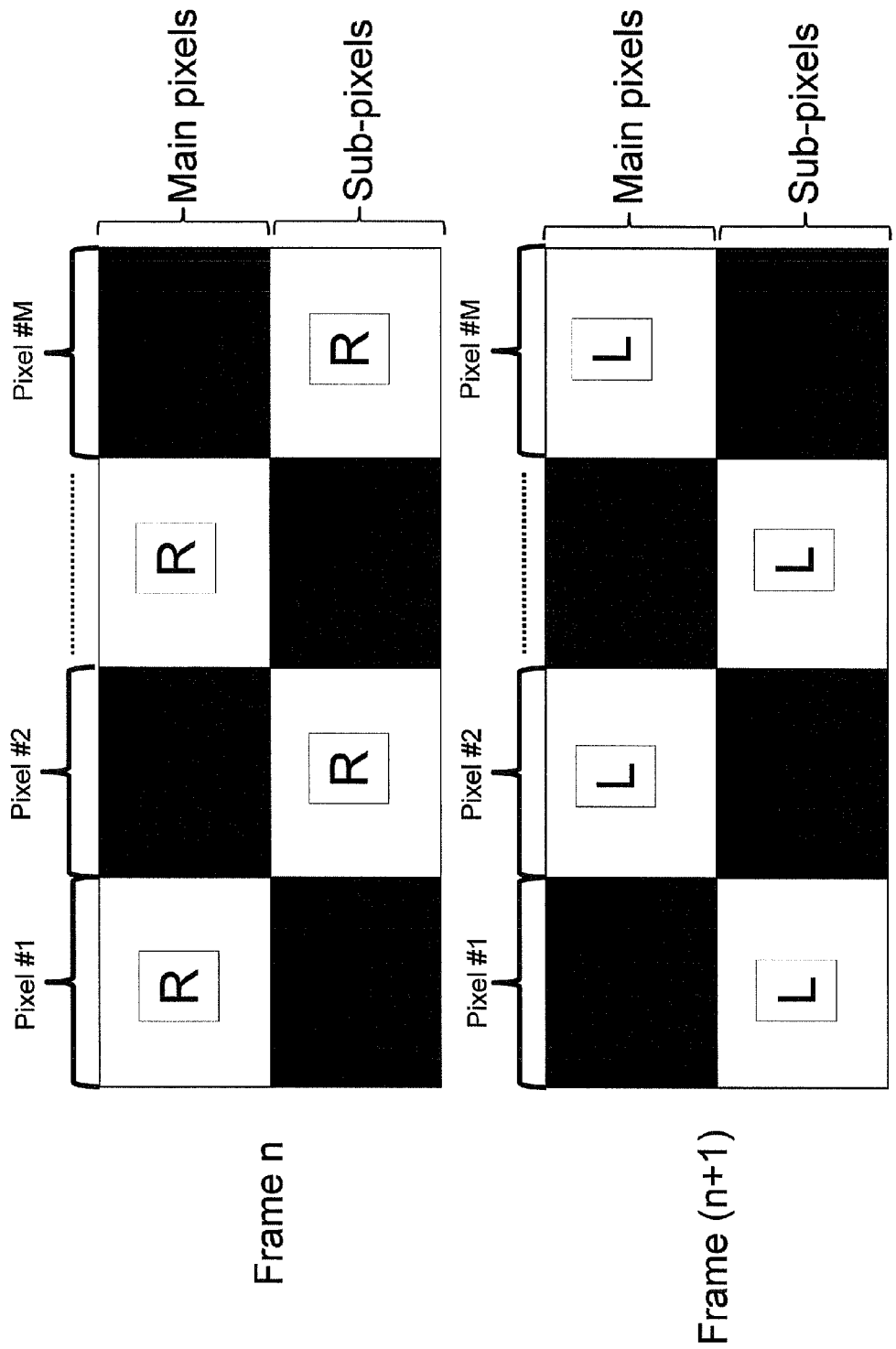
FIG. 2 is a block diagram describing position of black data and video data displayed by main pixels and sub-pixels for each of two successive frames in accordance with an embodiment of the invention.

FIG. 2 is a block diagram describing position of black data and video data as displayed by main pixels and sub-pixels for each of two successive frames, in accordance with an embodiment of the invention. FIG. 2 indicates the displayed locations of black data and video data in the main pixels and the sub-pixels of corresponding spatial regions of two adjacent video frames when processing is performed by the scaler/driving circuitry. FIG. 2 illustrates an exemplary first row of pixels for each of frames n and n+1. For example, if a frame comprises 1920×1080 pixels, FIG. 2 illustrates the M=1920 pixels in the first of 1080 rows of that frame. Each of the other rows (1080 total rows per frame) comprises 1920 pixels. Frame n may be defined as an even numbered frame while frame (n+1) may be defined as an odd numbered frame or vice-versa. As shown, each row of each frame comprises M pixels. As illustrated, each pixel comprises a main pixel and a sub-pixel. In the representative embodiment illustrated in FIG. 2, the main pixel is positioned on top of the sub-pixel. The scaler/driving circuitry drives the processed video into the liquid crystal display (LCD) such that the displayed frames alternate between the left eye and the right eye of a person viewing the display. Typically, a pair of shutter glasses may be synchronized to the scaler/driving circuitry and/or LCD to allow frames to be alternately displayed between the left eye and right eye. For example, frame n may correspond to a left frame for viewing by a person's left eye while frame (n+1) may correspond to a right frame for viewing by a person's right eye. Otherwise, as shown in FIG. 2 for example, frame n may correspond to a right frame for viewing by a person's right eye while frame (n+1) may correspond to a left frame for viewing by a person's left eye. In the illustrated embodiment provided by FIG. 2, each of the M pixels comprises a main pixel and a sub-pixel. For example, Pixel #1 or any odd numbered pixel (i.e., 3, 5, 7, etc.) of frame n comprises a main pixel displaying video data and a sub-pixel displaying black data. In other embodiments, the relative position of a main pixel to its sub-pixel may be different from what is shown in the exemplary block diagram of FIG. 2. Black data may be defined as data producing black colored pixels. The black data comprises data which may provide the lowest level of luminance as perceived by the human eye. Pixel #2 or any even numbered pixel (i.e., 4, 6, 8, etc.) of frame n comprises a main pixel displaying black data and a sub-pixel displaying video data. Likewise, Pixel #1 of frame (n+1) comprises a main pixel displaying black data and a sub-pixel displaying video data. Pixel #2 of frame (n+1) comprises a main pixel displaying video data and a sub-pixel displaying black data. Thus, as illustrated in FIG. 2, the location of displayed black data and video data alternates between main and sub-pixels of adjacent pixels of a frame. Thus, it is evident that the displayed spatial position of the black data differs between corresponding pixels of adjacent frames. By way of employing such spatial and temporal processing of the received video, crosstalk or overlap between two sequential frames is reduced.

Figure 3:
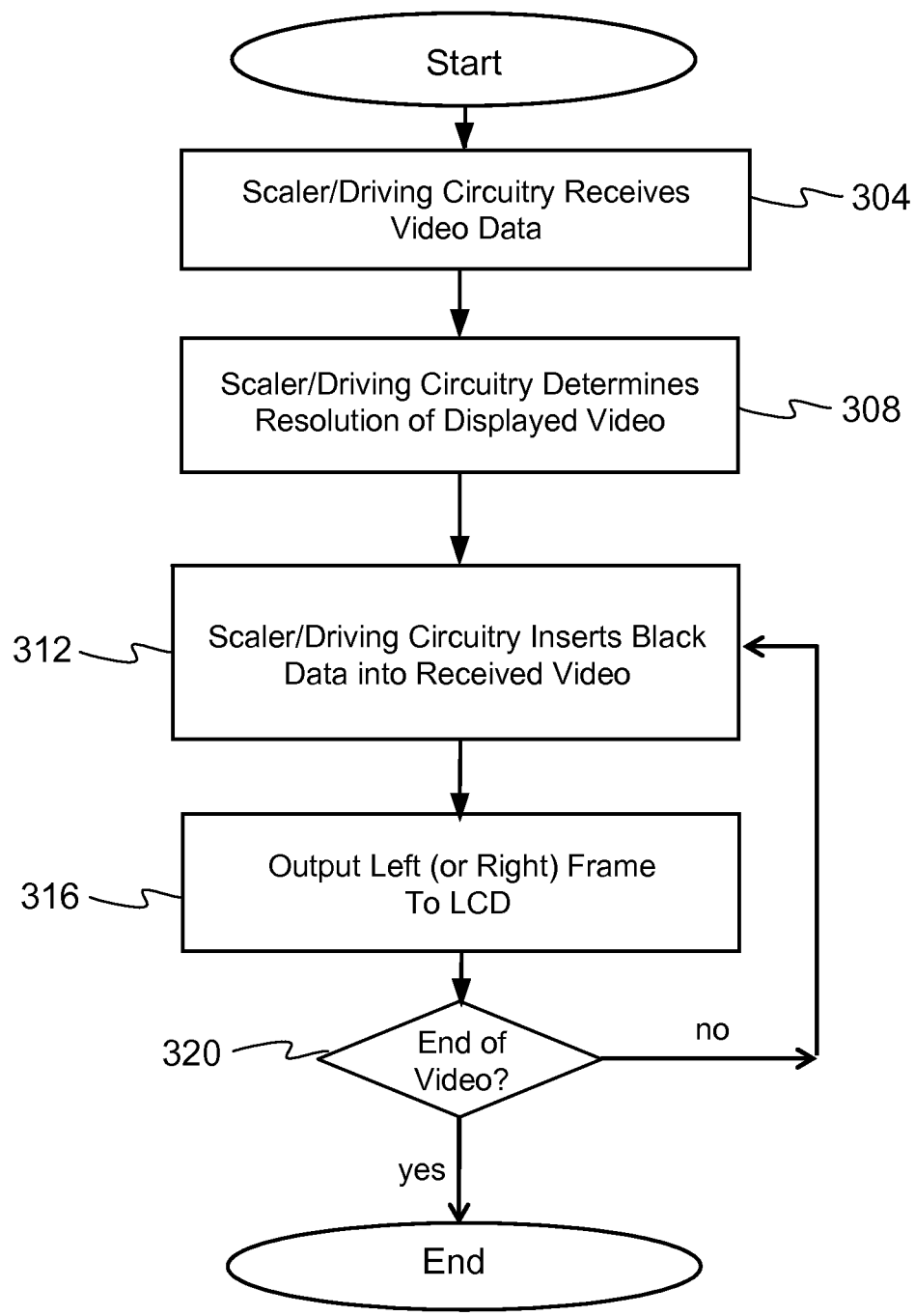
FIG. 3 is an operational flow diagram of a method for processing video for displaying three dimensional images to a viewer on a liquid crystal display, in accordance with an embodiment of the invention.

FIG. 3 is an operational flow diagram of a method for processing video for displaying three dimensional images to a viewer on a liquid crystal display, in accordance with an embodiment of the invention. At step 304, a scaler/driving circuitry receives video data provided from the antenna/set-top box. The antenna/set-top box receives the video data from a carrier such as a cable operator, for example. The video data may comprise any type of video content capable of being processed by the scaler/driving circuitry and is used for displaying three dimensional images or video. At step 308, the scaler/driving circuitry determines the resolution of the displayed video. In a representative embodiment, the resolution of the display may comprise 1920×1080 pixels (i.e., 2,073,600 pixels) wherein each of the pixels may comprise a main pixel and sub-pixel. The 2,073,600 pixels comprises even and odd numbered pixels which may be identified in a frame going from left to right for each of 1920 columns for each row of pixels. In a representative embodiment, a frame may display the 1920×1080 pixels at a frame rate of 240 Hz. In an alternate embodiment, the frame rate may comprise any other frame rate such as 120 Hz. At step 312, the scaler/driving circuitry processes the received video data by incorporating or inserting black data into the received video such that the black data is displayed in a sub-pixel or main pixel of each pixel of a frame. Thus, the black data is inserted into the received video to yield the patterns described in accordance with the illustrative embodiment pictured in FIG. 2. The black data may comprise video data having amplitude that generates the darkest possible luma by a main pixel or sub-pixel of the LCD, for example. After all black data is inserted into the appropriate locations of the received video, the video is transmitted to a liquid crystal display (LCD) for viewing. At step 316, the scaler/driving circuitry outputs video corresponding to a left (or right) frame to the LCD. The LCD displays the frame to a user. At step 320, a decision is made whether the end of a video program has been reached. If the end of the video program has been reached, the process ends. If the end of the video program has not been reached, the process jumps back to step 312 at which the process continues with the scaler/driving circuitry inserting black data into video corresponding to another frame of received video. If, at step 320, the end of the video program has been reached, the process ends.

The various aspects of the invention may allow the scaler/driving circuitry to switch from a three dimensional mode, as previously described in FIGS. 1-3, to a two dimensional mode. In the two dimensional mode, the sub-pixels may be used to provide a wider viewing angle. Furthermore, in the two dimensional mode, black data is not inserted into the received data and each frame is processed for displaying to both eyes simultaneously.

The various aspects of the present invention may be realized using one or more circuits and/or hardware and/or combination of hardware and software. For example, the one or more circuits and/or hardware and/or combination of hardware and software may be used to implement the scaler/driving circuitry and/or the antenna/set-top box, as was previously described in connection with FIGS. 1-3.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of processing video for displaying said video in three dimensions comprising:
   receiving said video; and
   inserting black data into said received video, said black data displayed by main pixels and sub-pixels of each frame of a plurality of frames,
   wherein if said main pixels of even numbered pixels of a first set of frames display said black data then said sub-pixels that spatially correspond to said main pixels in a second set of frames display said black data, and
   wherein if said sub-pixels of odd numbered pixels of said first set of frames display said black data then said main pixels that spatially correspond to said sub-pixels in said second set of frames display said black data.

2. The method of claim 1 wherein said first set of frames comprises even numbered frames and said second set of frames comprises odd numbered frames or said second set of frames comprises even numbered frames and said first set of frames comprises odd numbered frames.

3. The method of claim 1 wherein said first set of frames are viewed by a first eye of a viewer and said second set of frames are viewed by a second eye of said viewer.

4. The method of claim 1 wherein each frame of said first set of frames and said second set of frames comprises 1920×1080 pixels, and each of said even numbered pixels and said odd numbered pixels comprises a main pixel and a sub-pixel.

5. The method of claim 4 wherein a frame rate of said plurality of frames is equal to 240 Hz.

6. The method of claim 1 wherein said video is displayed by a liquid crystal display.

7. A method of processing video for displaying said video in three dimensions comprising:
   receiving video data;
   inserting black data into said video data wherein said black data is displayed by main pixels in even numbered pixels of even numbered frames and sub-pixels in odd numbered pixels of said even numbered frames;
   inserting said black data into said video data wherein said black data is displayed by main pixels in odd numbered pixels of odd numbered frames and sub-pixels in even numbered pixels of said odd numbered frames; and
   of said even and odd numbered frames, sequentially transmitting an even numbered frame followed by an odd numbered frame or an odd numbered frame followed by an even numbered frame to a display.

8. The method of claim 7 wherein a first frame of said video comprises one of said even numbered frames.

9. The method of claim 7 wherein a first frame of said video comprises one of said odd numbered frames.

10. The method of claim 7 wherein a frame of said even numbered frames or said odd numbered frames comprises 1920×1080 pixels, and each of said even numbered pixels and said odd numbered pixels comprises a main pixel and a sub-pixel.

11. The method of claim 10 wherein a frame rate of at least one of said frames is equal to 240 Hz.

12. The method of claim 7 wherein said display comprises a liquid crystal display.

13. A system for processing video to display a three dimensional image comprising:
   one or more circuits operable for, at least:
   receiving said video; and
   inserting black data into said received video, said black data displayed by main pixels and sub-pixels of each frame of a plurality of frames,
   wherein if said main pixels of even numbered pixels of a first set of frames display said black data then said sub-pixels that spatially correspond to said main pixels in a second set of frames display said black data, and
   wherein if said sub-pixels of odd numbered pixels of said first set of frames display said black data then said main pixels that spatially correspond to said sub-pixels in said second set of frames display said black data.

14. The system of claim 13 wherein said first set of frames comprises even numbered frames and said second set of frames comprises odd numbered frames or said second set of frames comprises even numbered frames and said first set of frames comprises odd numbered frames.

15. The system of claim 13 wherein said first set of frames are viewed by a first eye of a viewer and said second set of frames are viewed by a second eye of said viewer.

16. The system of claim 13 wherein each frame of said first set of frames and said second set of frames comprises 1920×1080 pixels, and each of said even numbered pixels and said odd numbered pixels comprises a main pixel and a sub-pixel.

17. The system of claim 16 wherein a frame rate of said plurality of frames is equal to 240 Hz.

18. The system of claim 13 wherein said video is displayed by a liquid crystal display.

19. A system for processing video for displaying said video in three dimensions comprising:
   one or more circuits operable for, at least:
   receiving video data;
   inserting black data into said video data wherein said black data is displayed by main pixels in even numbered pixels of even numbered frames and sub-pixels in odd numbered pixels of said even numbered frames;
   inserting said black data into said video data wherein said black data is displayed by main pixels in odd numbered pixels of odd numbered frames and sub-pixels in even numbered pixels of said odd numbered frames; and
   of said even and odd numbered frames, sequentially transmitting an even numbered frame followed by an odd numbered frame or an odd numbered frame followed by an even numbered frame to a display.

20. The system of claim 19 wherein a first frame of said video comprises one of said even numbered frames.

21. The system of claim 19 wherein a first frame of said video comprises one of said odd numbered frames.

22. The system of claim 19 wherein a frame of said even numbered frames or said odd numbered frames comprises 1920×1080 pixels, and each of said pixels comprises a main pixel and a sub-pixel.

23. The system of claim 22 wherein a frame rate of at least one of said frames is equal to 240 Hz.

24. The system of claim 19 wherein said display comprises a liquid crystal display.

* * * * *